(12) United States Patent
Susca et al.

(10) Patent No.: US 11,898,496 B1
(45) Date of Patent: Feb. 13, 2024

(54) FUEL SYSTEM WITH BACKUP PUMP SOURCE SELECTION

(71) Applicant: Hamilton Sundstrand Corporation, Charlotte, NC (US)

(72) Inventors: Ryan Prescott Susca, Windsor, CT (US); Morgan O'Rorke, West Hartford, CT (US); Adrian L. Stoicescu, Roscoe, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/870,078

(22) Filed: Jul. 21, 2022

(51) Int. Cl.
*F02C 7/236* (2006.01)
*F02C 7/232* (2006.01)

(52) U.S. Cl.
CPC .............. *F02C 7/236* (2013.01); *F02C 7/232* (2013.01); *F05D 2220/323* (2013.01); *F05D 2260/607* (2013.01); *F05D 2260/84* (2013.01)

(58) Field of Classification Search
CPC ............ F02C 7/22; F02C 7/232; F02C 7/236; F02C 7/228; F02M 37/0047; F04D 15/0072
See application file for complete search history.

(56) References Cited

U.S. PATENT DOCUMENTS

| | | | |
|---|---|---|---|
| 2,782,595 A | 2/1957 | Pauly | |
| 9,316,157 B2 * | 4/2016 | Ripley | F02C 7/32 |
| 9,657,643 B2 * | 5/2017 | Veilleux, Jr. | F02C 7/236 |
| 9,828,916 B2 | 11/2017 | Masuda | |
| 9,850,917 B2 | 12/2017 | Mueller et al. | |
| 11,203,978 B2 * | 12/2021 | O'Rorke | F02C 7/236 |
| 2003/0074884 A1 | 4/2003 | Snow et al. | |
| 2007/0113554 A1 | 5/2007 | Yates et al. | |
| 2013/0192244 A1 * | 8/2013 | Ripley | F02C 7/32 60/776 |
| 2015/0101339 A1 * | 4/2015 | Veilleux, Jr. | F02C 7/236 60/734 |
| 2019/0112987 A1 * | 4/2019 | O'Rorke | F02K 3/10 |
| 2021/0222625 A1 * | 7/2021 | O'Rorke | F02C 7/236 |

FOREIGN PATENT DOCUMENTS

GB    771837 A    4/1957

OTHER PUBLICATIONS

Extended European Search Report issued in European Application No. 23184703.9 dated Nov. 30, 2023.

* cited by examiner

*Primary Examiner* — Alain Chau
(74) *Attorney, Agent, or Firm* — CANTOR COLBURN LLP

(57) ABSTRACT

A fuel system of an aircraft engine, having: a boost pump having an input and an output; one or more selector valves; a first component pump having an input fluidly coupled to the output of the boost pump and an output of the first component pump is configured to direct fuel to a first component via the one or more selector valves; and a second component pump having an input that is selectively coupled to either the input or the output of the boost pump by the one or more selector valves, and an output of the second component pump is fluidly coupled to a second component and selectively coupled to the first component by the one or more selector valves.

14 Claims, 6 Drawing Sheets

FUEL SYSTEM WITH BACKUP PUMP SOURCE SELECTION

BACKGROUND

Exemplary embodiments pertain to the art of fuel systems for a gas turbine engine of an aircraft and more specifically to a fuel system with a backup pump source selection.

In fuel delivery systems within gas turbine engines, a boost pump may be required to deliver fuel to a component such as a combustor. Due to different flow requirements at different phases of flight and engine operation, the boost pump is typically oversized and not optimized for most of its standard operating range, which may result in wasted power, excess heat and operation inefficiencies at normal cruise/low power conditions.

BRIEF SUMMARY

Disclosed is a fuel system of an aircraft engine, including: a boost pump having an input and an output; one or more selector valves; a first component pump having an input fluidly coupled to the output of the boost pump and an output of the first component pump is configured to direct fuel to a first component via the one or more selector valves; and a second component pump having an input that is selectively coupled to either the input or the output of the boost pump by the one or more selector valves, and an output of the second component pump is fluidly coupled to a second component and selectively coupled to the first component by the one or more selector valves.

In addition to one or more aspects of the system disclosed herein or as an alternate, the system further includes a fuel filter fluidly coupled to the output of the boost pump.

In addition to one or more aspects of the system disclosed herein or as an alternate, the system further includes a plurality of flowpaths, including: a first flowpath extending between the output of the boost pump and the input of the first component pump, wherein the fuel filter is disposed along the first flowpath; a second flowpath extending between the output of the first component pump and the first component via the one or more selector valves; a third flowpath extending between the input of the boost pump and the input of the second component pump via the one or more selector valves; a fourth flowpath extending between the output of the second component pump and the second component; a fifth flowpath extending between the fourth flowpath and the first component via the one or more selector valves; and a sixth flowpath extending from the first flowpath, between the fuel filter and the first component pump, to the third flowpath via the one or more selector valves.

In addition to one or more aspects of the system disclosed herein or as an alternate, the system further includes an engine controller configured to: determine when the first component pump is offline and the first component requires fuel; and control the one or more selector valves to: direct fuel from the output of the boost pump to the second component pump via the one or more selector valves; and direct fuel from the second component pump to the first component via the one or more selector valves.

In addition to one or more aspects of the system disclosed herein or as an alternate, the one or more selector valves includes a first selector valve having: a first port that is fluidly coupled to the output of the first component pump; a second port that is fluidly coupled to the first component; and a third port that is fluidly coupled to the output of the second component pump.

In addition to one or more aspects of the system disclosed herein or as an alternate, the first selector valve further includes: a fourth port that is fluidly coupled to the output of the boost pump; a fifth port that is fluidly coupled to the input of the boost pump; and a sixth port that is fluidly coupled to the input of the second component pump.

In addition to one or more aspects of the system disclosed herein or as an alternate, the system further includes a solenoid operationally coupled to the first selector valve.

In addition to one or more aspects of the system disclosed herein or as an alternate, the one or more selector valves includes a second selector valve, the second selector valve including: a fourth port that is fluidly coupled to the output of the boost pump; a fifth port that is fluidly coupled to the input of the boost pump; and a sixth port that is fluidly coupled to the input of the second component pump.

In addition to one or more aspects of the system disclosed herein or as an alternate, the system further includes a solenoid operationally coupled to the first selector valve and the second selector valve.

In addition to one or more aspects of the system disclosed herein or as an alternate, the system further includes a first solenoid operationally coupled to the first selector valve; and a second solenoid operationally coupled to the second selector valve.

Further disclosed is an aircraft including: a gas turbine engine that includes a fuel system having one or more of the aspect disclosed herein and first and second components; and a fuel source fluidly coupled to the fuel system, wherein the fuel system is configured to direct fuel from the fuel source to the first and second components.

In addition to one or more aspects of the aircraft disclosed herein or as an alternate, the aircraft further includes a filter fluidly coupled to the output of the boost pump.

In addition to one or more aspects of the aircraft disclosed herein or as an alternate, the aircraft further includes a plurality of flowpaths, including: a first flowpath extending between the output of the boost pump and the input of the first component pump, wherein a fuel filter is disposed along the first flowpath; a second flowpath extending between the output of the first component pump and the first component via the one or more selector valves; a third flowpath extending between the input of the boost pump and the input of the second component pump via the one or more selector valves; a fourth flowpath extending between the output of the second component pump and the second component; a fifth flowpath extending between the fourth flowpath and the first component via the one or more selector valves; and a sixth flowpath extending from the first flowpath, between the fuel filter and the first component pump, to the third flowpath via the one or more selector valves.

In addition to one or more aspects of the aircraft disclosed herein or as an alternate, the first component is a combustor and the second component is an afterburner.

In addition to one or more aspects of the aircraft disclosed herein or as an alternate, the aircraft further includes an engine controller configured to: determine when the first component pump is offline and the combustor requires fuel; and control the one or more selector valves to: direct fuel from the output of the boost pump to the second component pump via the one or more selector valves; and direct fuel from the second component pump to the first component via the one or more selector valves.

In addition to one or more aspects of the aircraft disclosed herein or as an alternate, the engine controller is a full authority digital engine controller.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1A:
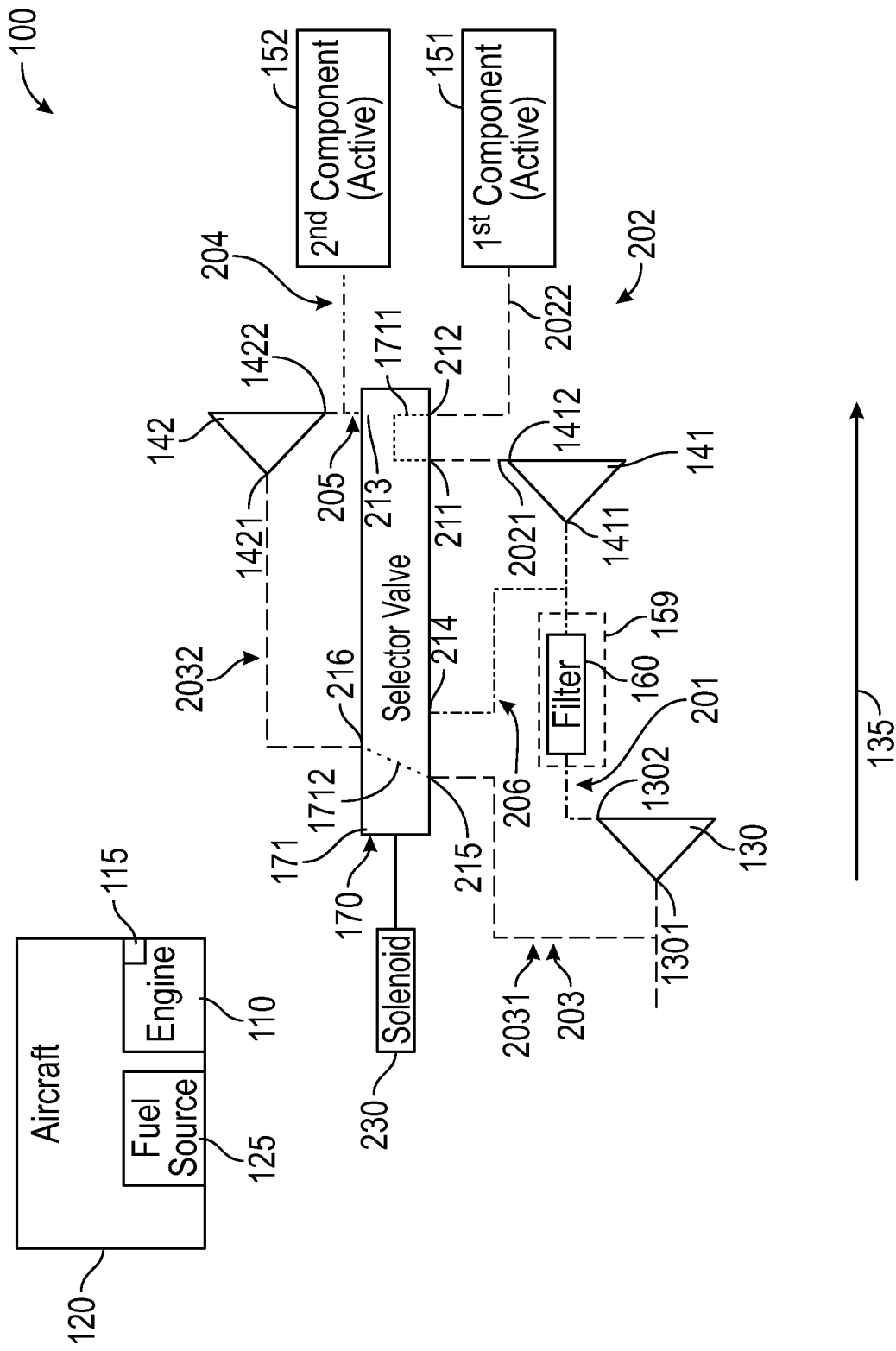
FIG. 1A shows a fuel system according to a first embodiment in which a first component is provided with fuel from a first component pump via a selector valve and a second component is provided with fuel from a combination of a boost pump and a second component pump via the selector valve.
Figure 1B:
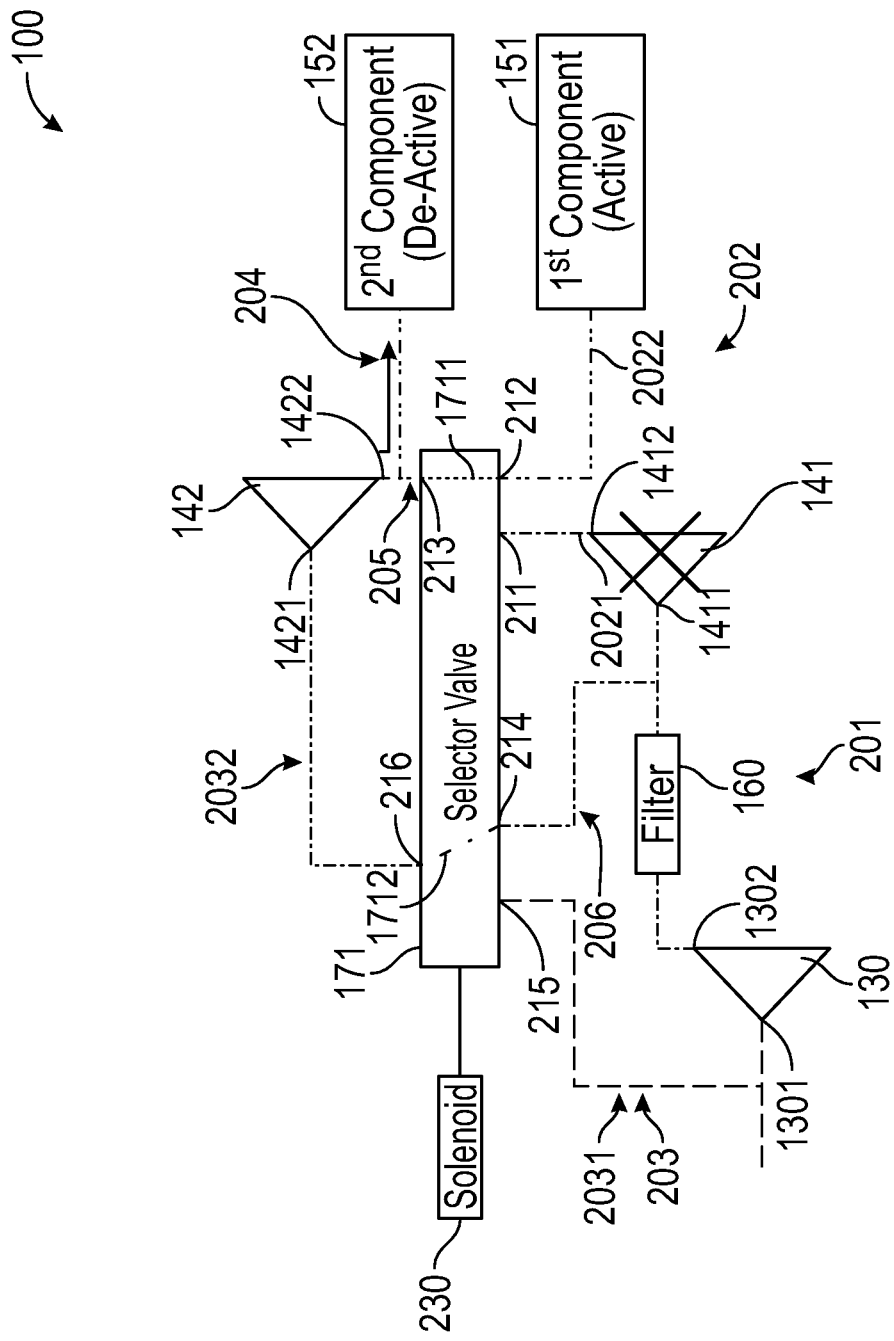
FIG. 1B shows a fuel system according to the first embodiment in which the first component is provided with fuel from a combination of the boost pump and the second component pump via the selector valve, and the first component pump and second component are inactive.

FIGS. 1A and 1B show a fuel system 100 of an engine 110, which may be a gas turbine engine. The engine 110 is controlled by an engine controller 115 which may be full authority digital engine controller (FADEC), in an aircraft 120 having a fuel source 125. The fuel system 100 may include a boost pump 130, having an input 1301 and an output 1302, for transferring fuel generally in a downstream flow direction 135. The fuel system 100 includes multiple dedicated component pumps, including first and second component pumps 141, 142, to feed fuel to respective components, such as first and second components 151, 152. The first component 151 may be a combustor that requires operating on filtered fuel, e.g., utilizing fuel filter 160. The second component 152 may be an afterburner that may not require filtered fuel. The filter 160, between the boost pump 130 and the first pump 141, may be housed within a fuel system interstage 159 (only shown in FIG. 1A for brevity but is generally applicable to each embodiment disclosed herein). The fuel system interstage 159 may house a number of components besides the filter 160, including a fuel filter bypass valve, fuel oil coolers, fuel air heat exchangers, generator heat exchangers, etc.

Due to its limited operational parameters, the second component pump 142 may be configured handle the second component 152 throughout its operational range without a boost from the boost pump 130. The first component pump 141 maybe sized to efficiently handle operation of the first component 151 during its normal engine operation phases. However, during high power conditions such as takeoff, the first component pump 141 may require a boost assist from the boost pump 130 in order for the first component pump 141 to operate sufficiently. By only requiring a boost to the first component pump 141 during limited operational parameters of the first component 151, the boost pump 130 may be smaller and more efficient than if it was required to normally boost both first and second component pumps 141, 142.

There may be a situation in which the first component pump 141 enters a failure mode and must be bypassed. The disclosed embodiments, as indicated below, also provide for a backup configuration in which filtered and boosted flow is provided to the first component 151 via the second component pump 142. As shown in the figures, one or more selector valves 170 is provided in the fuel system 100, which enables bypassing the first component pump 141 and directing filtered and boosted flow to the first component 151 via the second component pump 142.

As shown in FIGS. 1A and 1B, the one or more selector vales includes a first valve 171. The first component pump 141 has an input 1411 fluidly coupled to the output 1302 of the boost pump 130. An output 1412 of the first component pump 141 is configured to direct fuel to the first component 151 via the first valve 171. That is, the output 1412 of the first component pump 141 and the first component 151 are both connected to the first valve 171. The second component pump 142 has an input 1421 that is selectively coupled to either the input 1301 (FIG. 1A), which is not boosted, or output 1302 (FIG. 1B) of the boost pump 130 by the first valve 171. That is, the input 1421 and output 1422 of the boost pump 130 are both connected to the first valve 171. An output 1422 of the second component pump 142 is fluidly coupled to the second component 152. The output 1422 of the second component pump 142 is also selectively coupled to the first component 151 by the first valve 171. That is, the output 1422 of the second component pump 142 is also connected to the first valve 171. The fuel filter 160 is fluidly coupled to the output 1302 of the boost pump 130, between the boost pump 130 and the first component pump 141. As indicated, the first component 151 may require boosted and filtered fuel but the second component 152 may not require boosted and filtered fuel.

A plurality of flowpaths extend through the system 100 and fluidly couple the components of it. A first flowpath 201 extends between the output 1302 of the boost pump 130 and the input 1411 of the first component pump 141. A second flowpath 202 extends between the output 1412 of the first component pump 141 and the first component 151 via the first valve 171. Thus a first portion 2021 of the second flowpath 202 extends between the output 1412 of the first component pump 141 and the first valve 171 and a second portion of the second flowpath 2022 extends from the first valve 171 toward the first component 151. A third flowpath 203 extends between the input 1301 of the boost pump 130 and the input 1421 of the second component pump 142 via the first valve 171. Thus, a first portion 2031 of the third flowpath 203 is between the input 1301 of the boost pump 130 and the first valve 171 and a second portion 2032 of the third flowpath 203 is between the first valve 171 and the second component pump 142. The fuel filter 160 is disposed along the third flowpath 203. A fourth flowpath 204 extends between the output 1422 of the second component pump 142 and the second component 152. A fifth flowpath 205 extends between the fourth flowpath 204 and the first component 151 via the first valve 171. That is, a branch off the fourth flowpath 204 is connected to the first valve 171 to define the fifth flowpath 205. A sixth flowpath 206 extends from the first flowpath 201, at a location between the fuel filter 160 and the first component pump 141, to the third flowpath 203 via the first valve 171. That is, the sixth flowpath 206 is a branch off the first flowpath 201, downstream of the fuel filter 160, that extends to the first valve.

A plurality of ports are defined by the first valve 171 for fluidly coupling the components of the fuel system 100 via the flowpaths of the fuel system 100. A first port 211 of the first valve 171 is fluidly coupled to the output 1412 of the first component pump 141 via the first portion 2021 of the second flowpath 202. A second port 212 of the first valve 171 is fluidly coupled to the first component 151 via the second portion 2022 of the second flowpath 202. A third port 213 of the first valve 171 is fluidly coupled to the output 1422 of the second component pump 142 via the fifth flowpath 205 branch of the fourth flowpath 204.

The first valve 171 has a first internal passage 1711 that can selectively be in a first configuration (FIG. 1A) that connects the first port 211 with the second port 212 to fluidly connect the first and second portions 2021, 2022 of the second flowpath 202. Otherwise, in a second configuration (FIG. 1B), the first internal passage 1711 may connect the third port 213 with the second port 212, to fluidly connect the fifth flowpath 205 branch of the fourth flowpath 204 with the second portion 2022 of the second flowpath 202. The first configuration feeds the first component 151 from the first component pump 141 and the second configuration fees the first component 151 from the second component pump 142.

A fourth port 214 of the first valve 171 is fluidly coupled to the output 1302 of the boost pump 130 via the sixth flowpath 206 branch of the third flowpath 203. A fifth port 215 of the first valve 171 is fluidly coupled to the input 1301 of the boost pump 130 via the first portion 2031 of the third flowpath 203. A sixth port 216 of the first valve 171 is fluidly coupled to the input 1421 of the second component pump 142 via the second portion 2032 of the third flowpath 203.

The first valve 171 has a second internal passage 1712 that is fluidly isolated from the first internal passage 1711. The second internal passage 1712 can selectively be in a first configuration (FIG. 1A) that connects the fifth port 215 with the sixth port 216 to direct fuel that is not boosted or filtered to the second component pump 142. The second internal passage 1712 can selectively be in a second configuration (FIG. 1B) that connects the fourth port 214 with the sixth port 216 to direct fuel that is boosted and filtered to the second component pump 142. That is, the second configuration of the second internal passage 1712 bypasses the first component pump 141.

As shown in FIGS. 1A and 1B, a solenoid 230 is operationally coupled to the first valve 171. The solenoid 230 is configured to simultaneously position the first internal passage 1711 and second internal passage 1712 in their first configuration (FIG. 1A). In this configuration, defining a first configuration of the first valve 171, the first component 151 receives fuel from the first component pump 141 and the second component 152 receives fuel from the second component pump 142. The solenoid 230 is configured to simultaneously position the first internal passage 1711 and second internal passage 1712 in their second configuration (FIG. 1B). In this configuration, defining a second configuration of the first valve 171, the first component 151 receives fuel from the second component pump 141.

While the first valve 171 is in its first configuration (FIG. 1A), the engine controller 115 is configured to determine when the first component pump 141 is offline, e.g., due to failure, and the first component 151 requires fuel. In response to this condition, the engine controller 115 is configured to control the solenoid 230 to put the first valve 171 in its second configuration (FIG. 2B), to direct fuel to the first component 151 via the boost pump 130 and the second component pump 142. In the second configuration, the second component 152 is deactivated.

Figure 2A:
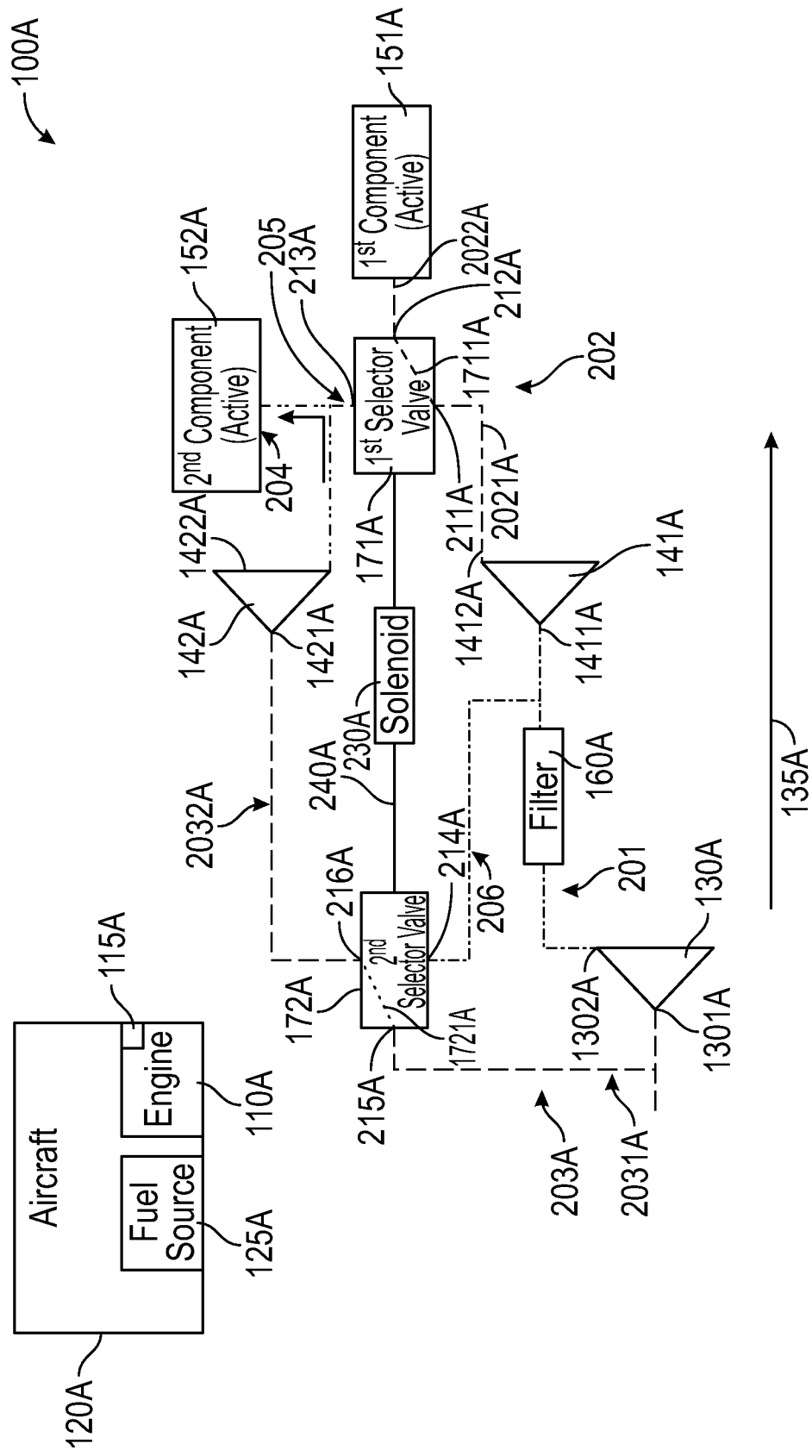
FIG. 2A shows a fuel system according to a second embodiment in which a first component is provided with fuel from a combination of a boost pump and a first component pump via first selector valve and a second component is provided with fuel from a second component pump via a second selector valve, and where the first and second selector valves are controlled by a common solenoid.
Figure 2B:
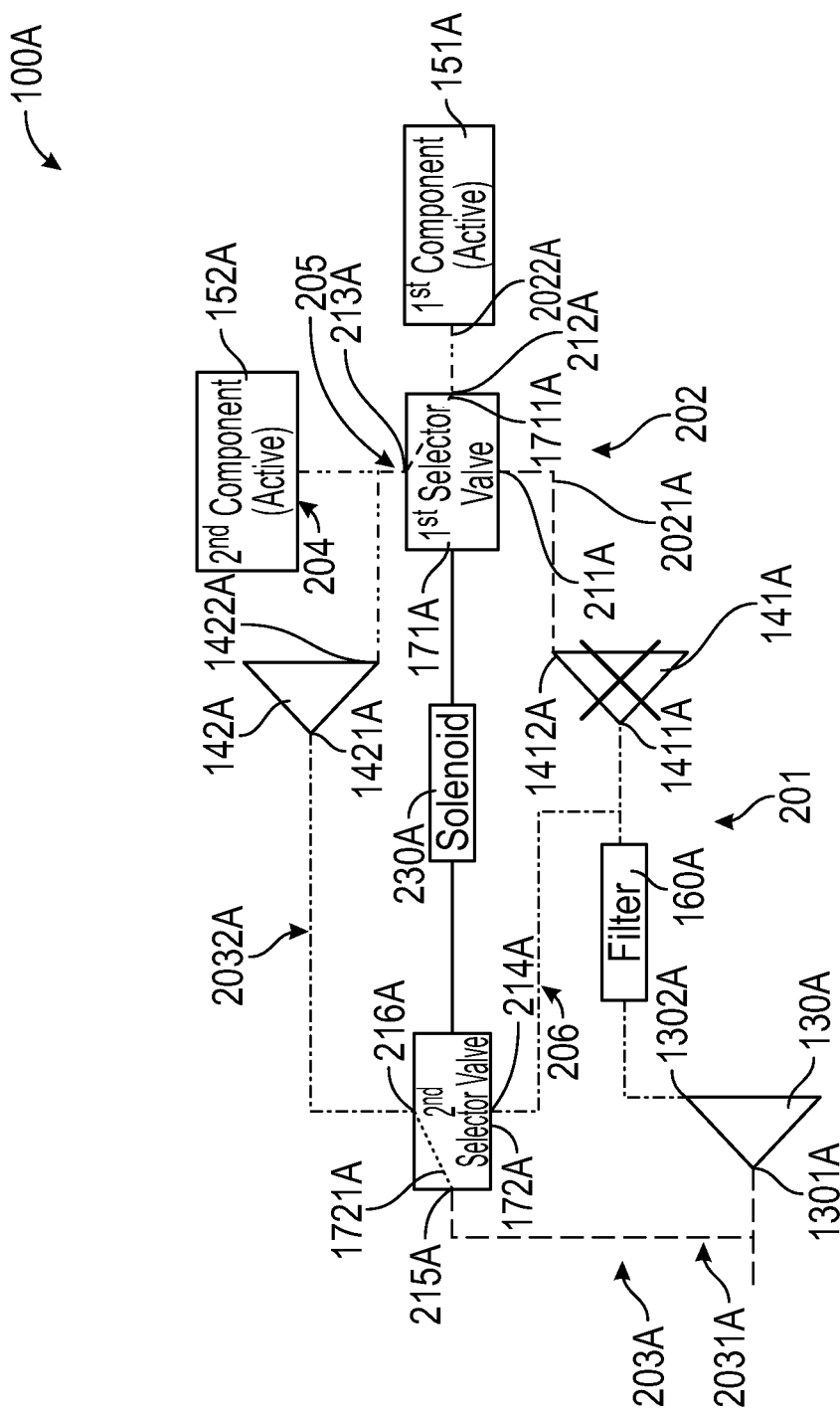
FIG. 2B shows a fuel system according to the second embodiment in which the first component is provided with fuel from a combination of the boost pump and the second component pump via the first and second selector valves, and the first component pump and second component are inactive.

In another embodiment, FIGS. 2A and 2B show a fuel system 100A of an engine 110A, which may be a gas turbine engine. The engine 110A is controlled by an engine controller 115A which may be full authority digital engine controller (FADEC), in an aircraft 120A having a fuel source 125A. The fuel system 100A may include a boost pump 130A, having an input 1301A and an output 1302A, for transferring fuel generally in a downstream flow direction 135A. The fuel system 100A includes multiple dedicated component pumps, including first and second component pumps 141A, 142A, to feed fuel to respective components, such as first and second components 151A, 152A. The first component 151A may be a combustor that requires operating on filtered fuel, e.g., utilizing fuel filter 160A. The second component 152A may be an afterburner that may not require filtered fuel.

Due to its limited operational parameters, the second component pump 142A may be configured handle the second component 152A throughout its operational range without a boost from the boost pump 130A. The first component pump 141A maybe sized to efficiently handle operation of the first component 151A during its normal engine operation phases. However, during high power conditions such as takeoff, the first component pump 141A may require a boost assist from the boost pump 130A in order for the first component pump 141A to operate sufficiently. By only requiring a boost to the first component pump 141A during limited operational parameters of the first component 151A, the boost pump 130A may be smaller and more efficient than if it was required to normally boost both first and second component pumps 141A, 142A.

There may be a situation in which the first component pump 141A enters a failure mode and must be bypassed. The disclosed embodiments, as indicated below, also provide for a backup configuration in which filtered and boosted flow is provided to the first component 151A via the second component pump 142A. As shown in the figures, one or more selector valves 170A is provided in the fuel system 100A, which enables bypassing the first component pump 141A and directing filtered and boosted flow to the first component 151A via the second component pump 142A.

As shown in FIGS. 2A and 2B, the one or more selector vales includes a first valve 171A and a second valve 172A. The first component pump 141A has an input 1411A fluidly coupled to the output 1302A of the boost pump 130A. An output 1412A of the first component pump 141A is configured to direct fuel to the first component 151A via the first valve 171A. That is, the output 1412A of the first component pump 141A and the first component 151A are both connected to the first valve 171A. The second component pump 142A has an input 1421A that is selectively coupled to either the input 1301A (FIG. 2A), which is not boosted, or the output 1302A (FIG. 2B) of the boost pump 130A by the second valve 172A. That is, the input 1421A and output 1422A of the boost pump 130A are both connected to the second valve 172A. An output 1422A of the second component pump 142A is fluidly coupled to the second component 152A. The output 1422A of the second component pump 142A is also selectively coupled to the first component 151A by the first valve 171A. That is, the output 1422A of the second component pump 142A is also connected to the first valve 171A. The fuel filter 160A is fluidly coupled to the output 1302A of the boost pump 130A, between the boost pump 130A and the first component pump 141A. As indicated, the first component 151A may require boosted and filtered fuel but the second component 152A may not require boosted and filtered fuel.

A plurality of flowpaths extend through the fuel system 100A and fluidly couple the components of it. A first flowpath 201A extends between the output 1302A of the boost pump 130A and the input 1411A of the first component pump 141A. A second flowpath 202A extends between the output 1412A of the first component pump 141A and the first component 151A via the first valve 171A. Thus a first portion 2021A of the second flowpath 202A extends between the output 1412A of the first component pump 141A and the first valve 171A and a second portion of the second flowpath 2022A extends from the first valve 171A toward the first component 151A. A third flowpath 203A extends between the input 1301A of the boost pump 130A and the input 1421A of the second component pump 142A via the second valve 172A. Thus, a first portion 2031A of the third flowpath 203A is between the input 1301A of the boost pump 130A and the first valve 171A and a second portion 2032A of the third flowpath 203A is between the second valve 172A and the second component pump 142A. The fuel filter 160A is disposed along the third flowpath 203A. A fourth flowpath 204A extends between the output 1422A of the second component pump 142A and the second component 152A. A fifth flowpath 205A extends between the fourth flowpath 204A and the first component 151A via the first valve 171A. That is, a branch off the fourth flowpath 204A is connected to the first valve 171A to define the fifth flowpath 205A. A sixth flowpath 206A extends from the first flowpath 201A, at a location between the fuel filter 160A and the first component pump 141A, to the third flowpath 203A via the second valve 172A. That is, the sixth flowpath 206A is a branch off the first flowpath 201A, downstream of the fuel filter 160A, that extends to the second valve 172A.

A plurality of ports are defined by the first valve 171A and second valve 172A for fluidly coupling the components of the fuel system 100A via the flowpaths of the fuel system 100. A first port 211A of the first valve 171A is fluidly coupled to the output 1412A of the first component pump 141A via the first portion 2021A of the second flowpath 202A. A second port 212A of the first valve 171A is fluidly coupled to the first component 151A via the second portion 2022A of the second flowpath 202A. A third port 213A of the first valve 171A is fluidly coupled to the output 1422A of the second component pump 142A via the fifth flowpath 205A branch of the fourth flowpath 204A.

The first valve 171A has a first internal passage 1711A that can selectively be in a first configuration (FIG. 2A) that connects the first port 211A with the second port 212A to fluidly connect the first and second portions 2021A, 2022A of the second flowpath 202A. Otherwise, in a second configuration (FIG. 2B), the first internal passage 1711A may connect the third port 213A with the second port 212A, to fluidly connect the fifth flowpath 205A branch of the fourth flowpath 204A with the second portion 2022A of the second flowpath 202A. The first configuration feeds the first component 151A from the first component pump 141A and the second configuration fees the first component 151A from the second component pump 142A.

A fourth port 214A of the second valve 172A is fluidly coupled to the output 1302A of the boost pump 130A via the sixth flowpath 206A branch of the third flowpath 203A. A fifth port 215A of the second valve 172A is fluidly coupled to the input 1301A of the boost pump 130A via the first portion 2031A of the third flowpath 203A. A sixth port 216A of the second valve 172A is fluidly coupled to the input 1421A of the second component pump 142A via the second portion 2032A of the third flowpath 203A.

The second valve 172A has a second internal passage 1721A that is fluidly isolated from the first internal passage 1711A. The second internal passage 1721A can selectively be in a first configuration (FIG. 2A) that connects the fifth port 215A with the sixth port 216A to direct fuel that is not boosted or filtered to the second component pump 142A. The second internal passage 1721A can selectively be in a second configuration (FIG. 2B) that connects the fourth port 214A with the sixth port 216A to direct fuel that is boosted and filtered to the second component pump 142A. That is, the second configuration of the second internal passage 1721A bypasses the first component pump 141A.

As shown in FIGS. 2A and 2B, a solenoid 230A is operationally coupled to the first valve 171A and the second valve 172A. The solenoid 230A is configured to simultaneously position the first internal passage 1711A and second internal passage 1721A in their first configuration (FIG. 2A). In this configuration, defining a first configuration of the first and second valves 171A, 172A the first component 151A receives fuel from the first component pump 141A and the second component 152A receives fuel from the second component pump 142A. The solenoid 230A is configured to simultaneously position the first internal passage 1711A and second internal passage 1721A in their second configuration (FIG. 2B). In this configuration, defining a second configuration of the first and second valves 171A, 172A the first component 151A receives fuel from the second component pump 141A.

While the first and second valves 171A, 172A are in their first configuration (FIG. 2A), the engine controller 115 is configured to determine when the first component pump 141A is offline, e.g., due to failure, and the first component 151A requires fuel. In response to this condition, the engine controller 115A is configured to control the solenoid 230A to put the first and second valves 171A, 172A in their second configuration (FIG. 2B), to direct fuel to the first component 151A via the boost pump 130A and the second component pump 142A. In the second configuration, the second component 152A is deactivated.

Figure 3A:
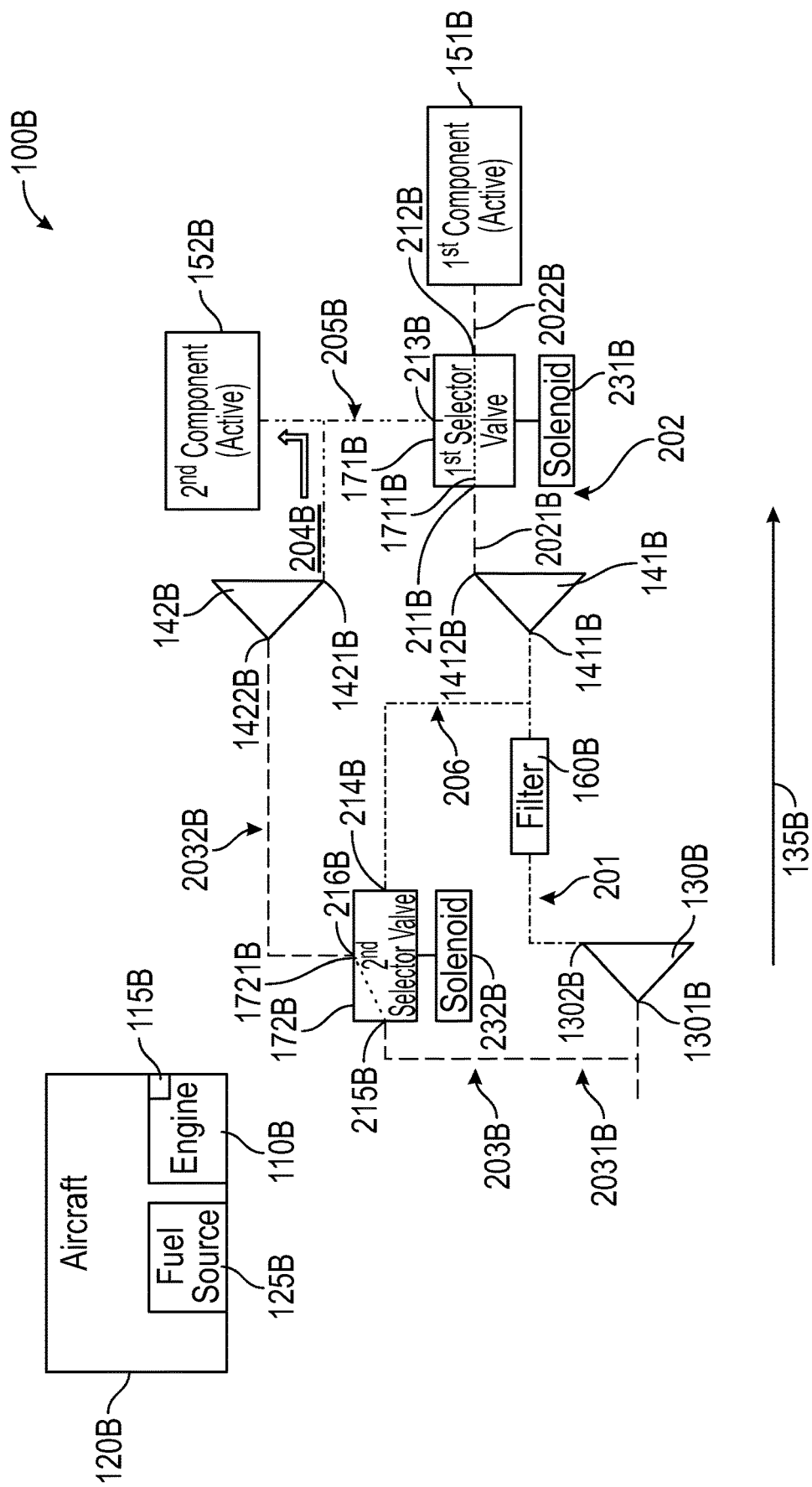
FIG. 3A shows a fuel system according to a third embodiment in which a first component is provided with fuel from a combination of a boost pump and a first component pump via a first selector valve and a second component is provided with fuel from a second component pump via a second selector valve, and where the first and second selector valves are controlled by respective first and second solenoids.
Figure 3B:
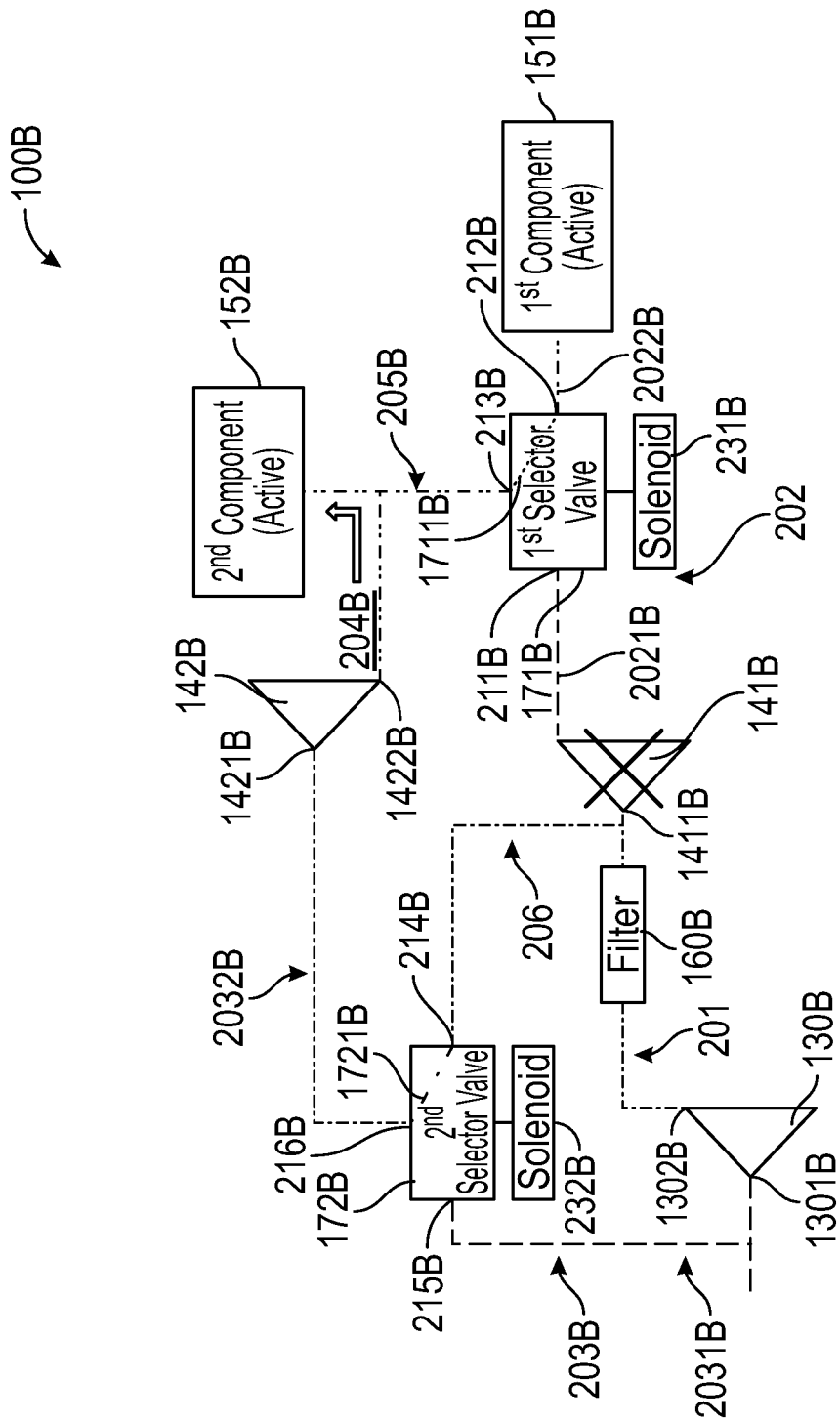
FIG. 3B shows a fuel system according to the third embodiment in which the first component is provided with fuel from a combination of the boost pump and the second component pump via the first and second selector valves, and the first component pump and second component are inactive.

In a further embodiment, FIGS. 3A and 3B show a fuel system 100B of an engine 110B, which may be a gas turbine engine. The engine 110B is controlled by an engine controller 115B which may be full authority digital engine controller (FADEC), in an aircraft 120B having a fuel source 125B. The fuel system 100B may include a boost pump 130B, having an input 1301B and an output 1302B, for transferring fuel generally in a downstream flow direction 135B. The fuel system 100B includes multiple dedicated component pumps, including first and second component pumps 141B, 142B, to feed fuel to respective components, such as first and second components 151B, 152B. The first component 151B may be a combustor that requires operating on filtered fuel, e.g., utilizing fuel filter 160B. The second component 152B may be an afterburner that may not require filtered fuel.

Due to its limited operational parameters, the second component pump 142B may be configured handle the second component 152B throughout its operational range without a boost from the boost pump 130B. The first component pump 141B maybe sized to efficiently handle operation of the first component 151B during its normal engine operation phases. However, during high power conditions such as takeoff, the first component pump 141B may require a boost assist from the boost pump 130B in order for the first component pump 141B to operate sufficiently. By only requiring a boost to the first component pump 141B during limited operational parameters of the first component 151B, the boost pump 130B may be smaller and more efficient than if it was required to normally boost both first and second component pumps 141B, 142B.

There may be a situation in which the first component pump 141B enters a failure mode and must be bypassed. The disclosed embodiments, as indicated below, also provide for a backup configuration in which filtered and boosted flow is provided to the first component 151B via the second component pump 142B. As shown in the figures, one or more selector valves 170B is provided in the fuel system 100B, which enables bypassing the first component pump 141B and directing filtered and boosted flow to the first component 151B via the second component pump 142B.

As shown in FIGS. 3A and 3B, the one or more selector vales includes a first valve 171B and a second valve 172B. The first component pump 141B has an input 1411B fluidly coupled to the output 1302B of the boost pump 130B. An output 1412B of the first component pump 141B is configured to direct fuel to the first component 151B via the first valve 171B. That is, the output 1412B of the first component pump 141B and the first component 151B are both connected to the first valve 171B. The second component pump 142B has an input 1421B that is selectively coupled to either the input 1301B (FIG. 3A), which is not boosted, or the output 1302B (FIG. 3B) of the boost pump 130B by the second valve 172B. That is, the input 1421B and output 1422B of the boost pump 130B are both connected to the second valve 172B. An output 1422B of the second component pump 142B is fluidly coupled to the second component 152B. The output 1422B of the second component pump 142B is also selectively coupled to the first component 151B by the first valve 171B. That is, the output 1422B of the second component pump 142B is also connected to the first valve 171B. The fuel filter 160B is fluidly coupled to the output 1302B of the boost pump 130B, between the boost pump 130B and the first component pump 141B. As indicated, the first component 151B may require boosted and filtered fuel but the second component 152B may not require boosted and filtered fuel.

A plurality of flowpaths extend through the fuel system 100B and fluidly couple the components of it. A first flowpath 201B extends between the output 1302B of the boost pump 130B and the input 1411B of the first component pump 141B. A second flowpath 202B extends between the output 1412B of the first component pump 141B and the first component 151B via the first valve 171B. Thus a first portion 2021B of the second flowpath 202B extends between the output 1412B of the first component pump 141B and the first valve 171B and a second portion of the second flowpath 2022B extends from the first valve 171B toward the first component 151B. A third flowpath 203B extends between the input 1301B of the boost pump 130B and the input 1421B of the second component pump 142B via the second valve 172B. Thus, a first portion 2031B of the third flowpath 203B is between the input 1301B of the boost pump 130B and the first valve 171B and a second portion 2032B of the third flowpath 203B is between the second valve 172B and the second component pump 142B. The fuel filter 160B is disposed along the third flowpath 203B. A fourth flowpath 204B extends between the output 1422B of the second component pump 142B and the second component 152B. A fifth flowpath 205B extends between the fourth flowpath 204B and the first component 151B via the first valve 171B. That is, a branch off the fourth flowpath 204B is connected to the first valve 171B to define the fifth flowpath 205B. A sixth flowpath 206B extends from the first flowpath 201B, at a location between the fuel filter 160B and the first component pump 141B, to the third flowpath 203B via the second valve 172B. That is, the sixth flowpath 206B is a branch off the first flowpath 201B, downstream of the fuel filter 160B, that extends to the second valve 172B.

A plurality of ports are defined by the first valve 171B and second valve 172B for fluidly coupling the components of the fuel system 100B via the flowpaths of the fuel system 100. A first port 211B of the first valve 171B is fluidly coupled to the output 1412B of the first component pump 141B via the first portion 2021B of the second flowpath 202B. A second port 212B of the first valve 171B is fluidly coupled to the first component 151B via the second portion 2022B of the second flowpath 202B. A third port 213B of the first valve 171B is fluidly coupled to the output 1422B of the second component pump 142B via the fifth flowpath 205B branch of the fourth flowpath 204B.

The first valve 171B has a first internal passage 1711B that can selectively be in a first configuration (FIG. 3A) that connects the first port 211B with the second port 212B to fluidly connect the first and second portions 2021B, 2022B of the second flowpath 202B. Otherwise, in a second configuration (FIG. 3B), the first internal passage 1711B may connect the third port 213B with the second port 212B, to fluidly connect the fifth flowpath 205B branch of the fourth flowpath 204B with the second portion 2022B of the second flowpath 202B. The first configuration feeds the first component 151B from the first component pump 141B and the second configuration fees the first component 151B from the second component pump 142B.

A fourth port 214B of the second valve 172B is fluidly coupled to the output 1302B of the boost pump 130B via the sixth flowpath 206B branch of the third flowpath 203B. A fifth port 215B of the second valve 172B is fluidly coupled to the input 1301B of the boost pump 130B via the first portion 2031B of the third flowpath 203B. A sixth port 216B of the second valve 172B is fluidly coupled to the input 1421B of the second component pump 142B via the second portion 2032B of the third flowpath 203B.

The second valve 172B has a second internal passage 1721B that is fluidly isolated from the first internal passage 1711B. The second internal passage 1721B can selectively be in a first configuration (FIG. 3A) that connects the fifth port 215B with the sixth port 216B to direct fuel that is not boosted or filtered to the second component pump 142B. The second internal passage 1721B can selectively be in a second configuration (FIG. 3B) that connects the fourth port 214B with the sixth port 216B to direct fuel that is boosted and filtered to the second component pump 142B. That is, the second configuration of the second internal passage 1721B bypasses the first component pump 141B.

As shown in FIGS. 2A and 2B, a first solenoid 231B is operationally coupled to the first valve 171B and a second solenoid 232B is operationally coupled to the second valve 172B. The first and second solenoids 231B, 232B are configured to simultaneously position the first internal passage 1711B and second internal passage 1721B in their first configuration (FIG. 3A). In this configuration, defining a first configuration of the first and second valves 171B, 172B the first component 151B receives fuel from the first component pump 141B and the second component 152B receives fuel from the second component pump 142B. The first and second solenoids 231B, 232B are configured to simultaneously position the first internal passage 1711B and second internal passage 1721B in their second configuration (FIG. 3B). In this configuration, defining a second configuration of the first and second valves 171B, 172B the first component 151B receives fuel from the second component pump 141B.

While the first and second valves 171B, 172B are in their first configuration (FIG. 3A), the engine controller 115 is configured to determine when the first component pump 141B is offline, e.g., due to failure, and the first component 151B requires fuel. In response to this condition, the engine controller 115B is configured to control the first and second solenoids 231B, 232B to put the first and second valves 171B, 172B in their second configuration (FIG. 3B), to direct fuel to the first component 151B via the boost pump 130B and the second component pump 142B. In the second configuration, the second component 152B is deactivated.

The embodiment shown in FIGS. 1A and 1B may be suitable for a large design envelope due to the potentially relatively large size of the selector valve. The embodiment shown in FIGS. 2A and 2B may be suitable for configurations in which the two selector valves and solenoid valve are configured as a single replaceable unit. The embodiment shown in FIGS. 3A and 3B may be suitable for configurations in which each selector valve and solenoid valve are configured as a replaceable unit. The pumps identified herein may be centrifugal, variable, fixed displacement, positive displacement, as nonlimiting examples.

The above embodiments reduce a required boost stage flow/pressure and provide backup flow for critical engine components. The embodiments also reduce fuel filter total flow. This reduces size, weight and horsepower requirements of the boost pump. The embodiments also improve boost stage efficiency, during cruise/low power conditions the difference between delivered flow and maximum will be lowered.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fuel system of an aircraft engine, comprising:
   a boost pump having an input and an output;
   one or more selector valves;
   a first component pump having an input fluidly coupled to the output of the boost pump and an output of the first component pump is configured to direct fuel to a first component via the one or more selector valves; and
   a second component pump having an input that is selectively coupled to either the input or the output of the boost pump by the one or more selector valves, and an output of the second component pump is fluidly coupled to a second component and selectively coupled to the first component by the one or more selector valves, and
   a plurality of flowpaths, including:
   a first flowpath extending between the output of the boost pump and the input of the first component pump;
   a second flowpath extending between the output of the first component pump and the first component via the one or more selector valves;
   a third flowpath extending between the input of the boost pump and the input of the second component pump via the one or more selector valves;
   a fourth flowpath extending between the output of the second component pump and the second component;
   a fifth flowpath extending between the fourth flowpath and the first component via the one or more selector valves; and
   a sixth flowpath extending from the first flowpath, between the output of the boost pump and the first component pump, to the third flowpath via the one or more selector valves.

2. The system of claim 1, comprising:
   a fuel filter fluidly disposed along the first flowpath and coupled to the output of the boost pump.

3. The system of claim 1, comprising:
   an engine controller configured to:
      determine when the first component pump is offline and the first component requires fuel; and
      control the one or more selector valves to:
         direct fuel from the output of the boost pump to the second component pump via the one or more selector valves; and
         direct fuel from the second component pump to the first component via the one or more selector valves.

4. The system of claim 1, wherein the one or more selector valves includes a first selector valve having:
   a first port that is fluidly coupled to the output of the first component pump;
   a second port that is fluidly coupled to the first component; and
   a third port that is fluidly coupled to the output of the second component pump.

5. The system of claim 4, wherein the first selector valve further includes:
- a fourth port that is fluidly coupled to the output of the boost pump;
- a fifth port that is fluidly coupled to the input of the boost pump; and
- a sixth port that is fluidly coupled to the input of the second component pump.

6. The system of claim 5, further comprising:
a solenoid operationally coupled to the first selector valve.

7. The system of claim 4, wherein the one or more selector valves includes a second selector valve, the second selector valve including:
- a fourth port that is fluidly coupled to the output of the boost pump;
- a fifth port that is fluidly coupled to the input of the boost pump; and
- a sixth port that is fluidly coupled to the input of the second component pump.

8. The system of claim 7, further comprising:
a solenoid operationally coupled to the first selector valve and the second selector valve.

9. The system of claim 7, further comprising:
- a first solenoid operationally coupled to the first selector valve; and
- a second solenoid operationally coupled to the second selector valve.

10. An aircraft comprising:
- a gas turbine engine that includes the fuel system of claim 1 and first and second components; and
- a fuel source fluidly coupled to the fuel system, wherein the fuel system is configured to direct fuel from the fuel source to the first and second components.

11. The aircraft of claim 10, comprising:
a fuel filter fluidly disposed along the first flowpath and coupled to the output of the boost pump.

12. The aircraft of claim 10, wherein:
the first component is a combustor and the second component is an afterburner.

13. The aircraft of claim 12, comprising:
an engine controller configured to:
- determine when the first component pump is offline and the combustor requires fuel; and
- control the one or more selector valves to:
  - direct fuel from the output of the boost pump to the second component pump via the one or more selector valves; and
  - direct fuel from the second component pump to the first component via the one or more selector valves.

14. The aircraft of claim 13, wherein the engine controller is a full authority digital engine controller.

* * * * *